(12) United States Patent
Johnson

(10) Patent No.: US 7,739,004 B2
(45) Date of Patent: Jun. 15, 2010

(54) AUTOMATIC ENGINE FUEL FLOW MONITORING AND ALERTING FUEL LEAK DETECTION METHOD

(75) Inventor: Richard A. Johnson, Renton, WA (US)

(73) Assignee: The Boeing Company, Chicago, IL (US)

( * ) Notice: Subject to any disclaimer, the term of this patent is extended or adjusted under 35 U.S.C. 154(b) by 866 days.

(21) Appl. No.: 11/605,657

(22) Filed: Nov. 29, 2006

(65) Prior Publication Data

US 2008/0125930 A1 May 29, 2008

(51) Int. Cl.
*G01C 5/00* (2006.01)
(52) U.S. Cl. .................. 701/9; 701/1; 701/3; 701/8
(58) Field of Classification Search .................. None
See application file for complete search history.

(56) References Cited

U.S. PATENT DOCUMENTS

| | | | | |
|---|---|---|---|---|
| 2,805,543 A * | 9/1957 | Wells et al. ............... 60/238 |
| 3,403,507 A * | 10/1968 | Schuster .................. 60/39.15 |
| 4,018,044 A * | 4/1977 | Joby et al. ................ 60/791 |
| 4,218,744 A | 8/1980 | Pratt et al. |
| 4,551,972 A * | 11/1985 | Lewis ...................... 60/39.281 |
| 4,618,931 A * | 10/1986 | Miller et al. ............. 701/100 |
| 4,787,053 A | 11/1988 | Moore |
| 4,972,700 A * | 11/1990 | Le ............................. 73/40 |
| 5,179,922 A | 1/1993 | Bartholomew |
| 5,270,935 A * | 12/1993 | Dudek et al. ............. 701/99 |
| 6,357,219 B1 * | 3/2002 | Dudd et al. ................ 60/790 |
| 6,459,963 B1 * | 10/2002 | Bennett et al. ............ 701/3 |
| 6,463,380 B1 * | 10/2002 | Ablett et al. ............. 701/100 |
| 6,466,858 B1 * | 10/2002 | Adibhatla et al. ......... 701/100 |
| 6,502,042 B1 * | 12/2002 | Eid et al. .................. 702/50 |
| 6,556,902 B2 * | 4/2003 | Ing et al. .................. 701/29 |
| 7,020,595 B1 * | 3/2006 | Adibhatla et al. ......... 703/7 |
| 7,343,232 B2 * | 3/2008 | Duggan et al. ........... 701/24 |
| 7,603,242 B2 * | 10/2009 | Tichborne et al. ........ 702/51 |
| 2003/0018928 A1 * | 1/2003 | James et al. ............. 714/25 |
| 2007/0234795 A1 * | 10/2007 | Goto ....................... 73/290 R |
| 2008/0103703 A1 * | 5/2008 | Tichborne et al. ........ 702/51 |

FOREIGN PATENT DOCUMENTS

| | | |
|---|---|---|
| JP | 2002310024 | 4/2001 |
| WO | WO/2006/032873 | 3/2006 |
| WO | WO 2006032873 A1 | 3/2006 |
| WO | WO 2006136736 A3 | 12/2006 |

OTHER PUBLICATIONS

Combined Search and Examination Report of Mar. 31, 2008, GB0723228.3.

* cited by examiner

*Primary Examiner*—Khoi Tran
*Assistant Examiner*—Bhavesh V Amin

(57) ABSTRACT

A method for automatically monitoring and alerting a fuel leak downstream of an engine fuel flow meter in an aircraft is provided. The method uses existing engine sensor data to input into a predetermined parameter model to predict the nominal fuel flow, and also compares fuel flow between a left engine and a right engine.

16 Claims, 8 Drawing Sheets

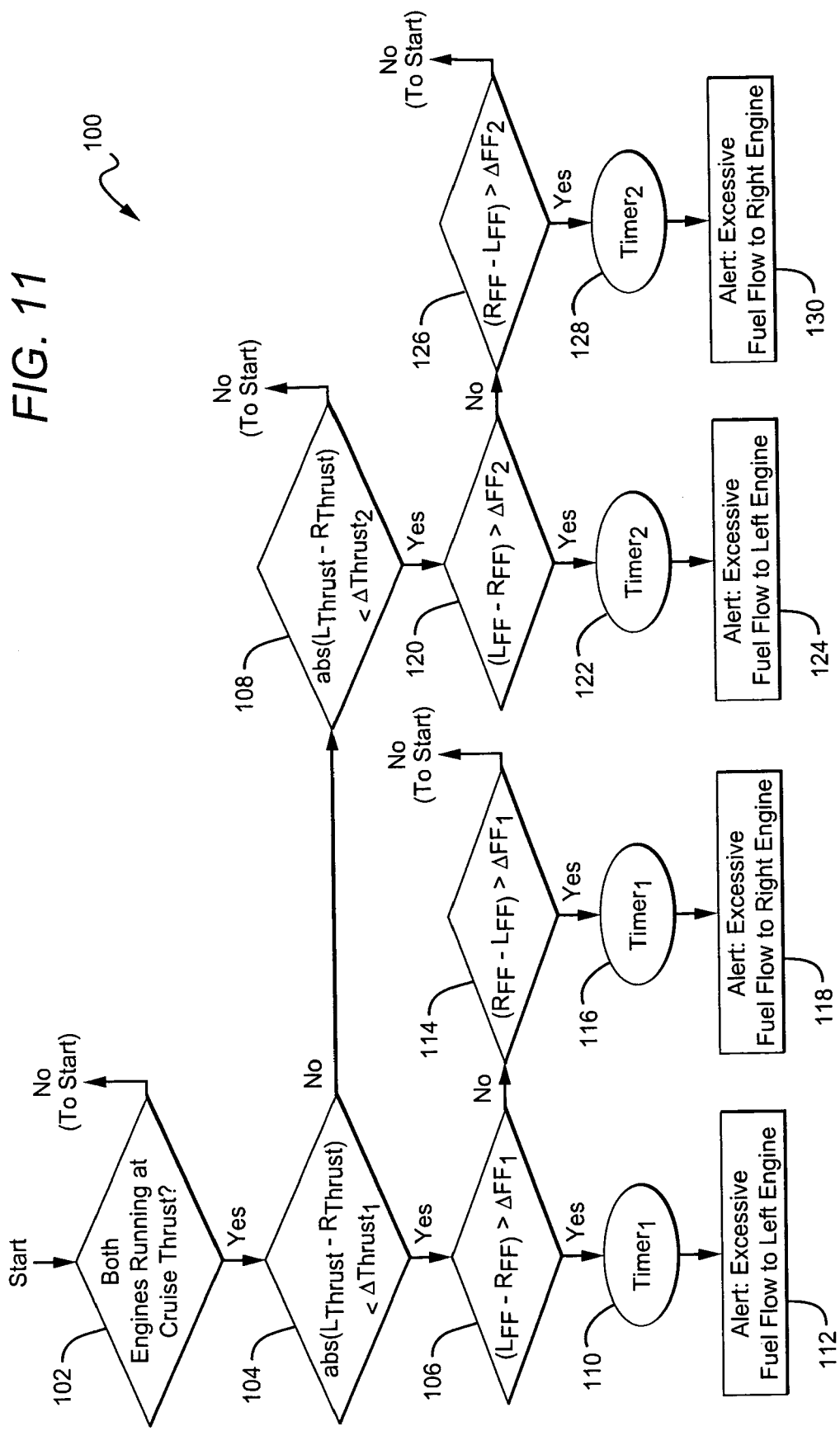

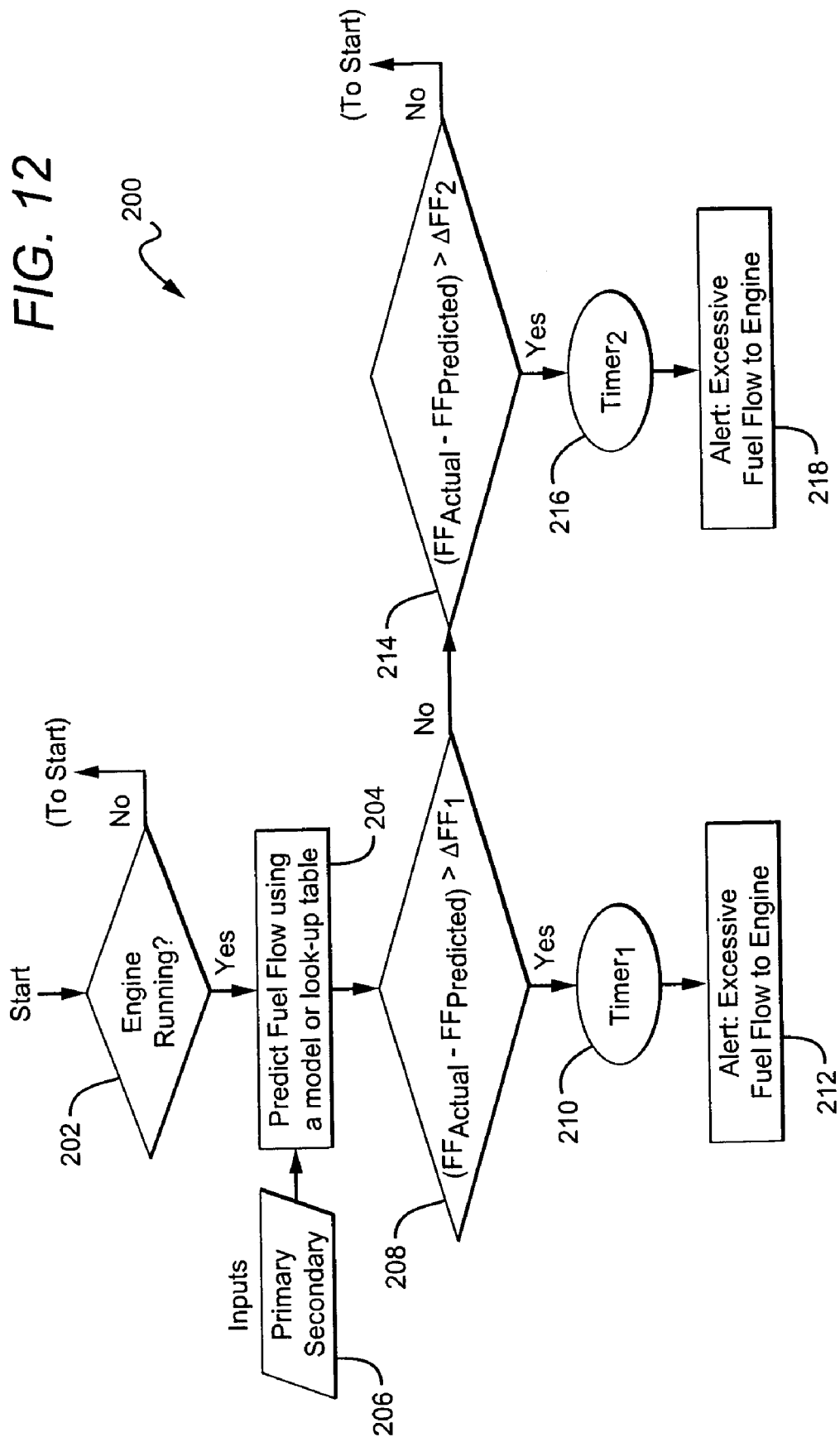

AUTOMATIC ENGINE FUEL FLOW MONITORING AND ALERTING FUEL LEAK DETECTION METHOD

BACKGROUND OF THE INVENTION

1) Field of the Invention

A fuel flow monitoring and alerting method for use with aircraft is provided. More particularly, an automatic engine fuel flow monitoring and alerting fuel leak detection method for use with aircraft is provided.

2) Description of Related Art

Fuel status and fuel consumption rates are of critical importance in the operation of aircraft engines. A precise indication of fuel supply allows pilots and flight crew to make informed decisions relating to flight plans and modifications thereof during the course of aircraft travel. Fuel leaks are a concern for aircraft on long haul missions. There have been incidents of fuel leaks that go undetected by the flight crew until effects of the leak are pronounced, such as missing fuel, and the leak is at a critical level. The flight crew must monitor numerous parameters in order to identify a fuel leak. Such close monitoring may not be practical for a long haul mission due to the pilot's or flight crew's workload. Pilot and flight crew monitoring is limited by various human factors such as fatigue and vigilance in monitoring. Known alert methods and devices on aircraft exist for detecting a tank leak or a leak upstream of the engine fuel flow meter. However, there are no known alerting methods for detecting and indicating a possible leak downstream of the fuel flow meter. The area downstream of the fuel flow meter is typically considered the fuel lines between the fuel flow meter and the fuel spray nozzles/combustor. Moreover, known fuel flow monitoring and alerting methods typically do not alert the pilot or flight crew of a fuel leak problem until it is too late to adequately solve the problem. Known fuel flow monitoring and alert methods for detecting a tank leak are typically annunciated with "Insufficient Fuel" displayed to the pilot or flight crew on the cockpit instrumentation display. Known fuel flow monitoring and alert methods for fuel leaks upstream of the fuel flow meter are typically annunciated with "Fuel Disagree" displayed to the pilot or flight crew on the cockpit instrumentation display. These alerts are often not annunciated until the problem has reached a critical level. Accordingly, there is a need for an improved automatic engine fuel flow monitoring and alerting fuel leak detection method for use with aircraft that does not have the problems associated with known systems and devices.

SUMMARY OF THE INVENTION

This need for an improved automatic engine fuel flow monitoring and alerting fuel leak detection method for use with aircraft that does not have the problems associated with known methods, as well as a unique, nonobvious, and advantageous system, is satisfied. None of the known methods provides all of the numerous advantages discussed herein. Unlike known methods, an embodiment of the automatic engine fuel flow monitoring and alerting fuel leak detection method for use with aircraft may provide one or more of the following advantages: improved safety to the flight crew, pilots, and passengers by alerting of a fuel leak before such fuel leak reaches a critical level; an indication alert earlier than known indication methods to support an earlier ETOPS (Extended Operations) diversion decision before it is too late; supports confirmation of a leak and possible shutdown of an affected engine; prevents nuisance or false alerts; an alerting logic that is not so conservative as to allow a substantial leak to go undetected; an alert that can use the existing EICAS (Engine Indication and Crew Alerting System) messaging system common in existing aircraft; a quick and efficient alert to the flight crew of excessive engine fuel flow and a possible engine fuel leak; mitigation of fuel leak concerns and increased reliability of identification of engine malfunctions in service; an alert in the area downstream from the fuel flow meter, and a timely alert so that the pilot can solve the problem; and, an indication at a lower threshold than existing quick reference handbook guidance methods.

In one embodiment of the invention, there is provided a method for automatically monitoring and alerting a fuel leak downstream of an engine fuel flow meter in an aircraft, the method comprising the steps of: obtaining a predicted fuel flow rate for each engine of the aircraft based on a set of predetermined reference operating parameters for each engine; obtaining a measured fuel flow rate for each engine of the aircraft based on actual operating parameters for each engine; using an engine monitoring system software to compare the predicted fuel flow rate to the measured fuel flow rate; and, automatically providing an alert on a flight deck display if there is a difference above a nuisance threshold between the measured fuel flow rate and the predicted fuel flow rate.

In another embodiment of the invention, there is provided a method for automatically monitoring and alerting a fuel leak downstream of an engine fuel flow meter in a multi-engine aircraft, the method comprising the steps of: obtaining a first thrust setting of a first engine and a second thrust setting of a second engine, such that the first thrust setting is equivalent to the second thrust setting; obtaining a fuel flow rate for the first engine and a fuel flow rate for the second engine; using an engine monitoring system software to compare the fuel flow rate for the first engine to the fuel flow rate of the second engine; and, automatically providing an alert on a flight deck display if there is a difference above a nuisance threshold between the fuel flow rate of the first engine and the fuel flow rate of the second engine.

BRIEF DESCRIPTION OF THE DRAWINGS

The foregoing and other advantages and features, and the manner in which the same are accomplished, will become more readily apparent upon consideration of the following detailed description taken in conjunction with the accompanying drawings which illustrate preferred and exemplary embodiments, but which are not necessarily drawn to scale, wherein:

FIG. 11 shows a flow chart of the logic of a cross engine comparison method with the monitoring and alert system of one embodiment of the method; and, FIG. 12 shows a flow chart of the logic of a modeling comparison method with the monitoring and alert system of one embodiment of the method.

DETAILED DESCRIPTION OF THE INVENTION

Embodiments of the invention now will be described more fully hereinafter with reference to the accompanying drawings, in which some, but not all embodiments of the invention are shown. Indeed, several different embodiments may be provided and should not be construed as limited to the embodiments set forth herein. Rather, these embodiments are provided so that this disclosure will be thorough and complete and will fully convey the scope of the invention to those skilled in the art. Like numbers refer to like elements throughout.

Figure 1:
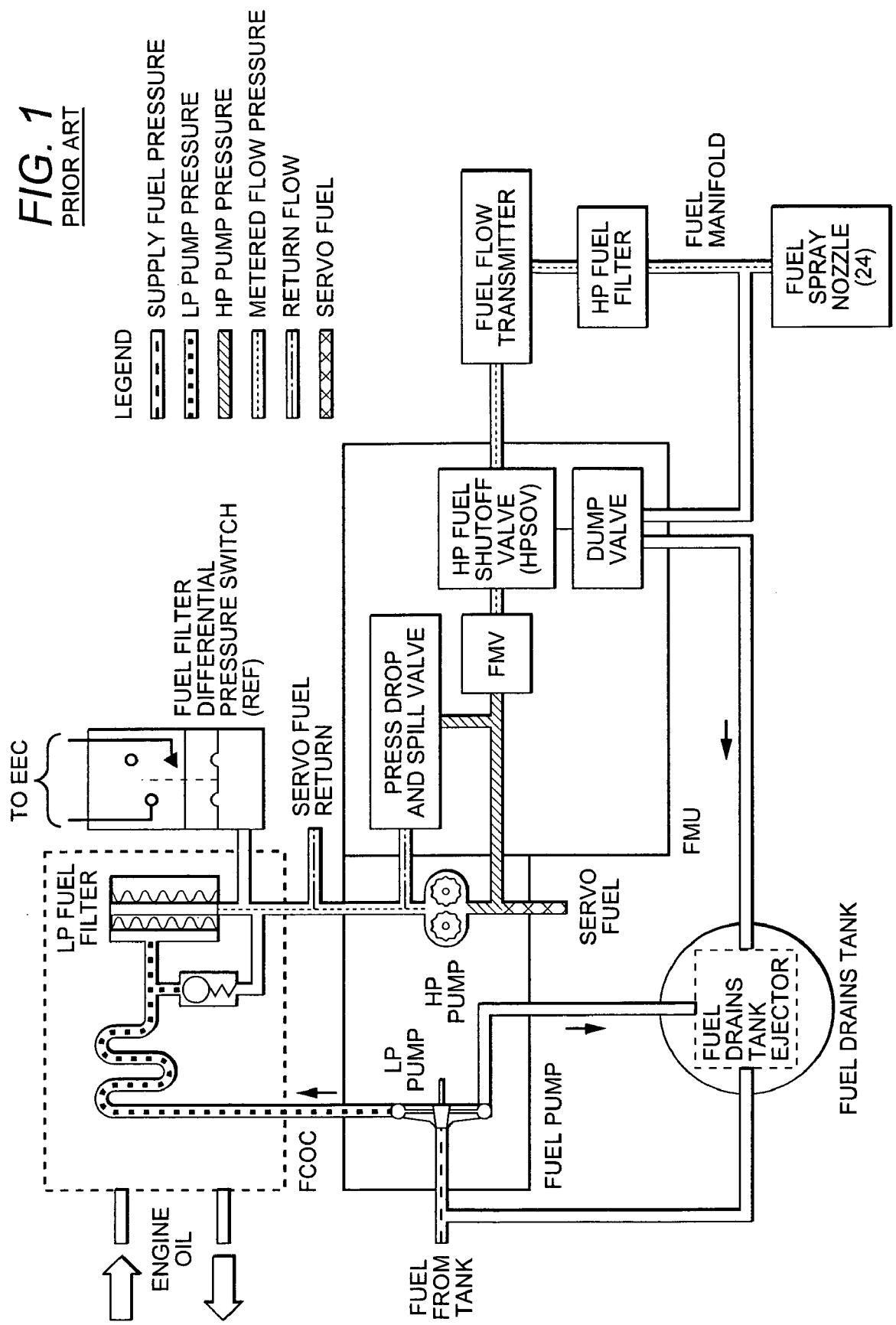
FIG. 1 is a detailed schematic diagram of a prior art fuel flow meter method and the accompanying hardware.

Referring now to the figures, FIG. 1 is a detailed schematic diagram of a prior art fuel flow meter system and the accompanying hardware. The measurement of fuel consumption rate provides an indication of the operating characteristics of an aircraft engine and whether or not an engine has lost power. Fuel flow monitoring devices must therefore monitor and display both fuel status and rate of fuel consumption to provide a total operating picture of the aircraft. Aircraft engines have a fuel flow meter on them, as well as other indications, that tell the pilots and flight crew how much thrust the engine is developing. Fuel flow meters have different accuracies at different consumption rates. They are designed to be very accurate when the aircraft is in cruise condition. They are less accurate when the aircraft is not in cruise condition.

In one embodiment of the invention, there is provided a method for automatically monitoring and alerting a fuel leak downstream of an engine fuel flow meter in an aircraft. FIG. 12 shows a flow chart of the logic of a modeling comparison method with the monitoring and alert system of this embodiment of the method. The definitions for the terms shown in FIG. 12 are defined below. Preferably, the aircraft is a multi-engine aircraft, and more preferably, the aircraft has two engines with a first engine on a first side of the aircraft and a second engine on a second side of the aircraft. The method comprises the step of obtaining a predicted fuel flow rate for each engine of the aircraft based on a set of predetermined reference operating parameters for each engine. Preferably, the predetermined reference operating parameters of the engine include engine thrust, airspeed, altitude, outside air temperature, engine accessory loads (such as electric generators, bleed air loads, hydraulic pump loads, and other loads), and engine age (number of cycles). The predetermined reference operating parameters for each engine may be obtained from a standard look-up table or quick reference handbook. The method further comprises the step of obtaining a measured fuel flow rate for each engine of the aircraft based on actual operating parameters for each engine. The measured fuel flow rate for each engine is obtained in several steps. A flow meter installed in the fuel line physically measures the volume of fuel traveling through the line. A fuel densitometer installed in the fuel tank computes the fuel density. Software multiplies the volumetric fuel flow rate by the fuel density to obtain a fuel mass flow rate which is displayed to the pilot. The method further comprises using an engine monitoring system software, such as an engine indication and crew alerting system (EICAS) software, to compare the predicted fuel flow rate to the measured fuel flow rate. The method further comprises the step of automatically providing an alert on a flight deck display if there is a difference above a nuisance threshold between the measured fuel flow rate and the predicted fuel flow rate. The predicted fuel flow rate is compared to the actual fuel flow at a certain engine thrust, altitude, and speed, and if the actual fuel flow rate is much higher than what is predicted, the message is flagged for that engine, and an alert is automatically displayed. The alert will preferably be automatically displayed if the measured fuel flow rate is a minimum of 15% percent higher than the predicted fuel flow rate. This 15% threshold depends primarily on the fuel criticality of the mission the aircraft is to fly. If the mission typically includes large amounts of reserve or contingency fuel, this percentage will increase. Conversely, if the mission typically includes small amounts of reserve or contingency fuel, this percentage will decrease. If the minimum higher percent is too large, the potential for a false negative indication would dictate the largest the minimum higher percent could be. Preferably, the alert displayed on the flight deck display indicates "ENG FF HIGH L,R" which means "Engine Fuel Flow High Left, Right", and either the left engine and/or the right engine will be indicated. The method provides alerts for excessive engine fuel flow, possible engine fuel leaks, secondary engine indications, fuel flow to the affected engine, and expanded fuel quantity indications. Preferably, the alert is an illuminated message displayed on the flight deck display in a cockpit. The nuisance threshold is determined through Numerical Probability Analysis (NPA). An economic penalty and a safety hazard are associated with a false positive indication. The economic penalty is due to the potential unnecessary diversion of the aircraft to an alternate airport other than its destination. The safety hazard is due to the perceived unreliability of the alerting system (pilots may distrust the alert and not take appropriate action). An acceptable level of occurrence of approximately $10^{-7}$ occurrences per flight would be assigned. The minimum higher percent (nominally 15%) is increased or reduced to provide the acceptable level of occurrence. Sensor errors must be compounded to determine nuisance potential. Very small variations in how accurate the sensor is adds potential to the nuisances.

Figure 10:
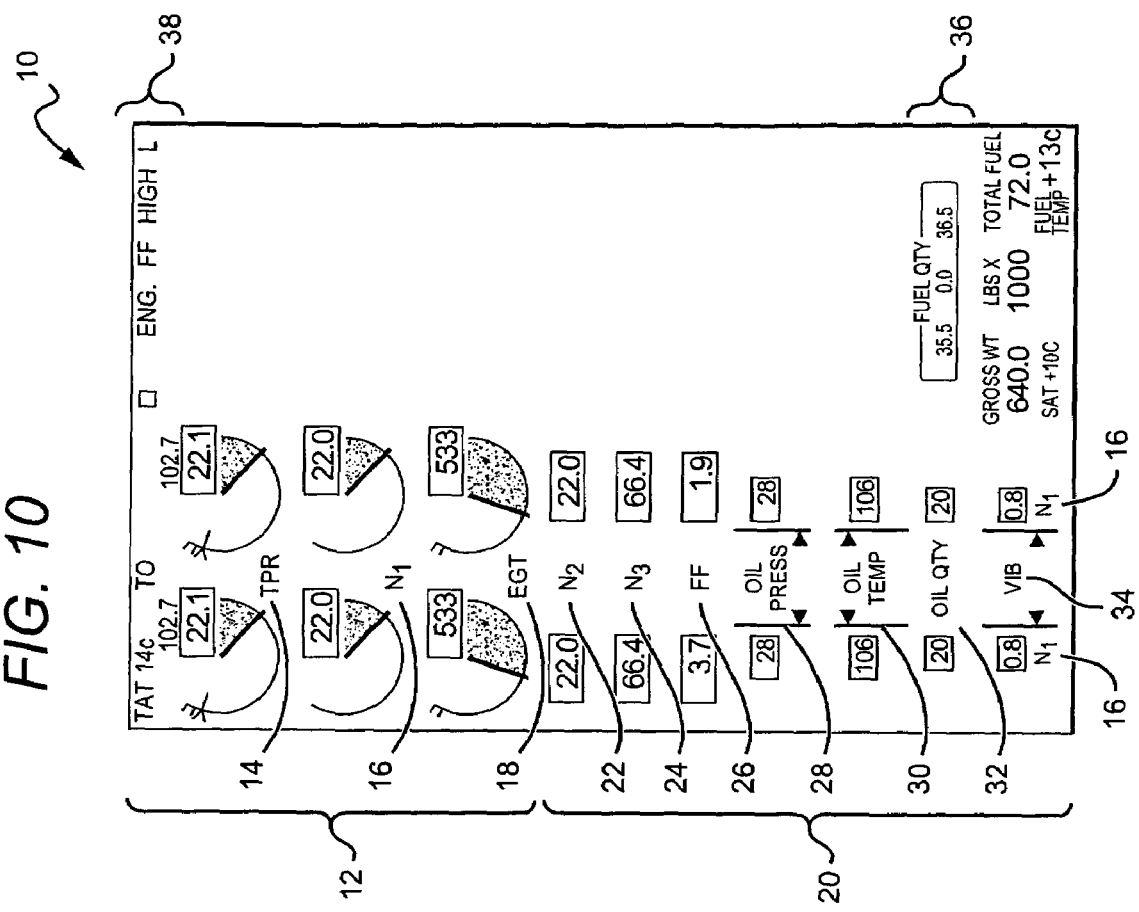
FIG. 10 shows an EICAS (Engine Indication and Crew Alerting System) display in an aircraft with the monitoring and alert system of one embodiment of the method.
Figure 9:
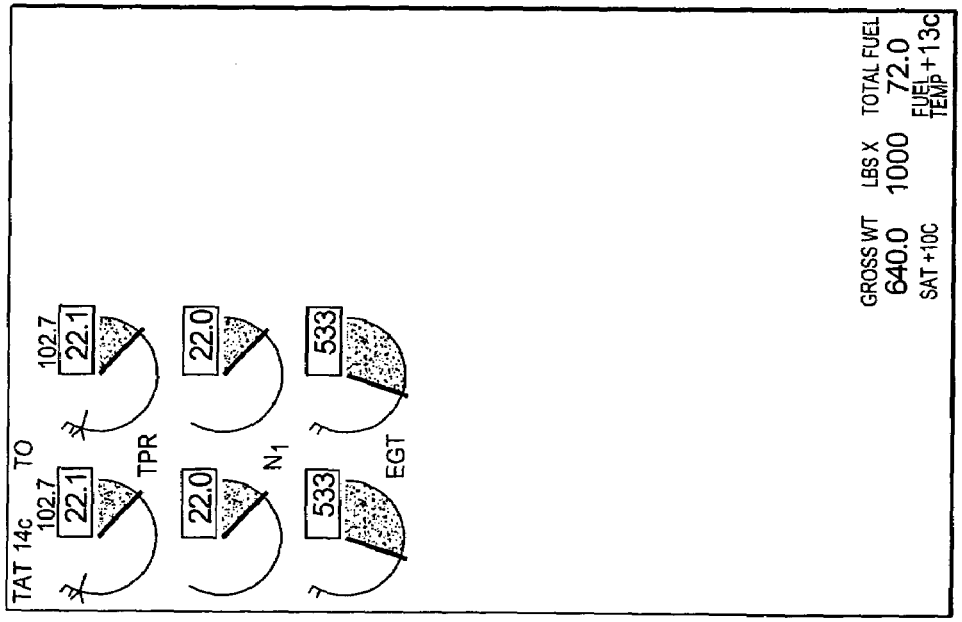
FIG. 9 shows a standard prior art EICAS (Engine Indication and Crew Alerting System) display in an aircraft.

The method preferably uses an engine monitoring system software, such as an Engine Indication and Crew Alerting System (EICAS) standard software, to provide an alert system and develop a preferred tolerance. FIG. 9 shows a standard prior art EICAS display in an aircraft. FIG. 10 shows an EICAS display 10 in an aircraft with the monitoring and alert system of one embodiment of the method. A portion 12 of the EICAS display as shown in the upper left portion of FIG. 10 is a standard display typical in an aircraft. This portion 12 includes indications for turbine pressure ratio (TPR) 14, fan speed (N1) 16, and exhaust gas temperature (EGT) 18. An automatic pop-up of secondary engine indication 20 is shown in the lower left portion of FIG. 10 and is a display included with an embodiment of the method. The automatic pop-up of secondary engine indications 20 includes indications for intermediate pressure shaft speed (N2) 22, high pressure shaft speed (N3) 24, fuel flow (FF) 26, oil pressure (OIL PRESS)

28, oil temperature (OIL TEMP) 30, oil quantity (OIL QTY) 32, and engine vibration (VIB) 34. The display 10 of this embodiment further includes expanded fuel quantity indications 36 that indicate to the pilot or flight crew the fuel quantity. The display 10 of this embodiment further includes an EICAS advisory level message 38 with electronic checklist icon latched in a checklist queue. The secondary engine indications 20 automatically display on EICAS. Fuel flow to the affected engine is preferably illuminated in an amber color on the flight deck display in the cockpit of the aircraft. The expanded fuel quantity indications 36 also display on EICAS. Software may be used to predict the normal engine fuel flow based on other engine indications. EICAS software may be used to compare this to the measured fuel flow and a message is triggered if the difference is excessive. There are also other lights and indications in the cockpit that will alert the flight crew to various conditions during flight. The method automatically monitors fuel flow to the engine and alerts the pilot or flight crew when engine fuel flow is excessive for the given thrust setting and other engine parameters. The method automatically and continuously monitors fuel status and rates of fuel consumption during the operation of an engine, and the method provides alert or warning indications for deviations in fuel consumption rates. The method of this embodiment uses existing engine sensor data to input into a model to predict the nominal fuel flow. In-service data may be used to update the model for unforeseen deviations from the model for normal variations, such as high fuel flow without an engine leak. All the engine parameters will preferably be displayed in a qualitative form (digital and graphical form) within a multi-function display on the aircraft flight deck. The engine parameters are sensed, recorded and output signals reflective of the current behavior of the engine are generated. The fuel flow indicator displays the total fuel flow to the engine in pounds per hour (pph). The fuel flow range is typically from zero to over 40,000 pounds per hour. The cruise fuel flow range is typically from 4,000 pounds per hour to 6,000 pounds per hour. This depends on the size of the engine. In addition, if the engine is idling, it will burn more than zero pounds per hour, and in this case, the fuel flow range is preferably approximately 1,000 pounds per hour to over 40,000 pounds per hour. The value is displayed in digital format. The engine parameters are determined using sensors placed at operable positions of the engine. The parameters are recorded and continuous output signals reflecting the current behavior of the engine are generated. These output signals are compared with predetermined reference signals in order to determine if the fuel flow rate parameter is operating in the safe or danger region.

Another embodiment of the method compares fuel flow between a left engine and a right engine. Preferably, the engines are of the same size. In this embodiment of the invention, there is provided a method for automatically monitoring and alerting a fuel leak downstream of an engine fuel flow meter in a multi-engine aircraft. FIG. 11 shows a flow chart of the logic of a cross engine comparison method with the monitoring and alert system of this embodiment of the method. The definitions for the terms shown in FIG. 11 are defined below. Preferably, the aircraft has two engines where a first engine is located on a first side or right side of the aircraft and a second engine is located on a second side or left side of the aircraft. The method comprises the step of obtaining a first thrust setting of a first engine and a second thrust setting of a second engine, such that the first thrust setting is equivalent to the second thrust setting. If the engines have equal thrust, they should be consuming the same amount of fuel per hour on each engine. The first check is that both engines are producing equal thrust within some tolerance. The first thrust setting and second thrust setting are obtained by the thrust setting parameter. This varies by engine manufacturer but is typically Engine Pressure Ratio (EPR) or Fan Speed (N1), which are the parameters most closely correlated to the engine thrust. EPR is measured by pressure sensors located in different parts of the engine. N1 is measured by transducers installed in the low pressure shaft. The method further comprises the step of obtaining a fuel flow rate for the first engine and a fuel flow rate for the second engine. The fuel flow rates for the first and second engines are obtained in several steps. A flow meter installed in the fuel line physically measures the volume of fuel traveling through the line. A fuel densitometer installed in the fuel tank computes the fuel density. Software multiplies the volumetric fuel flow rate by the fuel density to obtain a fuel mass flow rate which is displayed to the pilot. The method further comprises the step of using an engine monitoring system software, such as an engine indication and crew alerting system (EICAS) software, to compare the fuel flow rate for the first engine to the fuel flow rate of the second engine. The method further comprises the step of automatically providing an alert on a flight deck display if there is a difference above a nuisance threshold between the fuel flow rate of the first engine and the fuel flow rate of the second engine. If the thrust settings of the first and second engines are equivalent or similar, and the fuel flow rates differ significantly, a message alerts the flight crew of the discrepancy. Sensor errors may be compounded to determine nuisance potential. Preferably, the alert displayed on the flight deck display indicates "ENG FF DISAGREE" which means "Engine Fuel Flow Disagree", which means the fuel flow rates between the first or right engine and second or left engine disagree or are in discrepancy. Preferably, the alert is an illuminated message displayed on the flight deck display in a cockpit. Preferably, the method provides alerts for disagreement between the first or right engine fuel flow and the second or left engine fuel flow. Such a prompt or alert is indicated early. In addition, preferably, the method provides alerts for possible engine fuel leaks, secondary indications, and expanded fuel quantity indications. For example, if the left engine fuel lines becomes clogged and the fuel flow decreases as the left engine begins to fail (but momentarily still produces cruise thrust), the alert indicates there is a disagreement and the pilot can investigate to determine which engine is having a problem. The alert does not indicate which engine is having the problem. To find out which engine is having the problem, the pilot must compare it to other indications that are displayed and the pilot can use existing checklists and procedures that guide him or her through the investigation process. The nuisance threshold is determined through Numerical Probability Analysis (NPA). An economic penalty and a safety hazard are associated with a false positive indication. The economic penalty is due to the potential unnecessary diversion of the aircraft to an alternate airport other than its destination. The safety hazard is due to the perceived unreliability of the alerting system (pilots may distrust the alert and not take appropriate action). An acceptable level of occurrence of approximately $10^{-7}$ occurrences per flight would be assigned. The minimum higher percent (nominally 15%) is increased or reduced to provide the acceptable level of occurrence.

Figure 2:
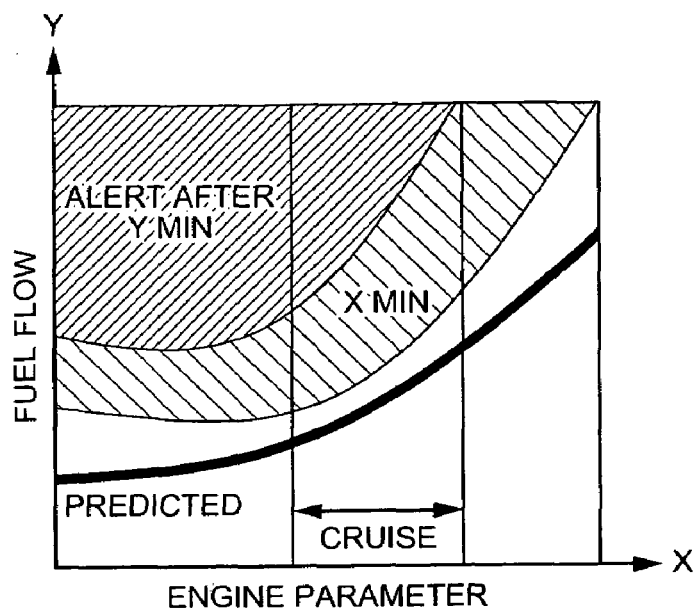
FIG. 2 is a graph showing an engine parameter percentage thrust versus fuel flow with the method of one embodiment of the invention.

FIG. 2 is a graph showing an engine parameter percentage thrust versus fuel flow with the method of one embodiment of the invention. The x axis shows the engine parameter percentage thrust. The y axis shows the fuel flow or how much fuel the engine is consuming. The "predicted" line in FIG. 2 predicts a certain fuel flow for every thrust setting. At a higher thrust setting, the engine consumes a higher amount of fuel. When the actual fuel flow is above the predicted line for sufficient time, the pilot or flight crew will be alerted that the engine is consuming more fuel for a given thrust setting than it should be. When the alert system is set at a first time period range "X min. (minutes)" (FIG. 2), the alert message is displayed after that amount of minutes, for example, 10 minutes. The "X min." range is associated with a small leak. When the alert system is set at a second time period range "Y min. (minutes)" (FIG. 2), the alert message is displayed after that amount of minutes, for example, 5 minutes. The "Y min." range is associated with a large leak. The severity of the fuel leak will determine whether to display the message at "X min." or display the message later at "Y min.".

Figure 3:
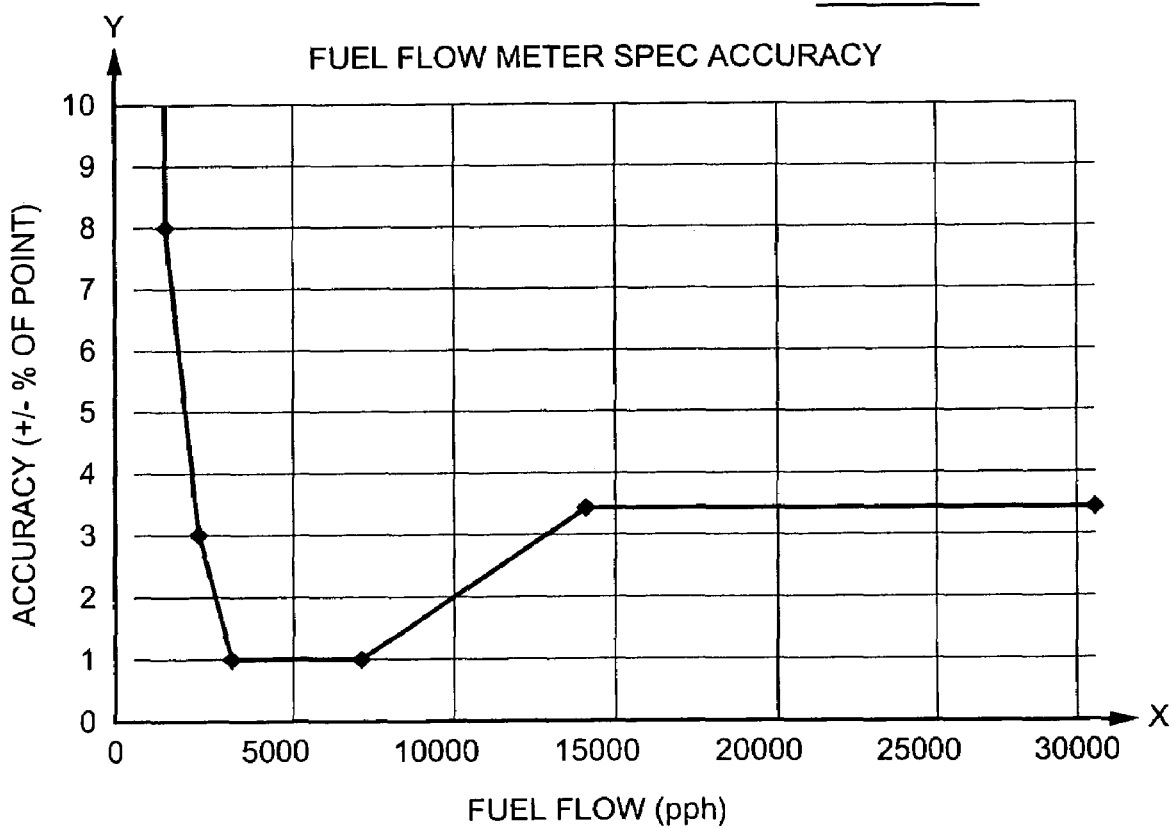
FIG. 3 is a graph plotting fuel flow pph (pounds per hour) versus accuracy of a standard fuel flow meter for a prior art aircraft fuel flow meter.
Figure 4:
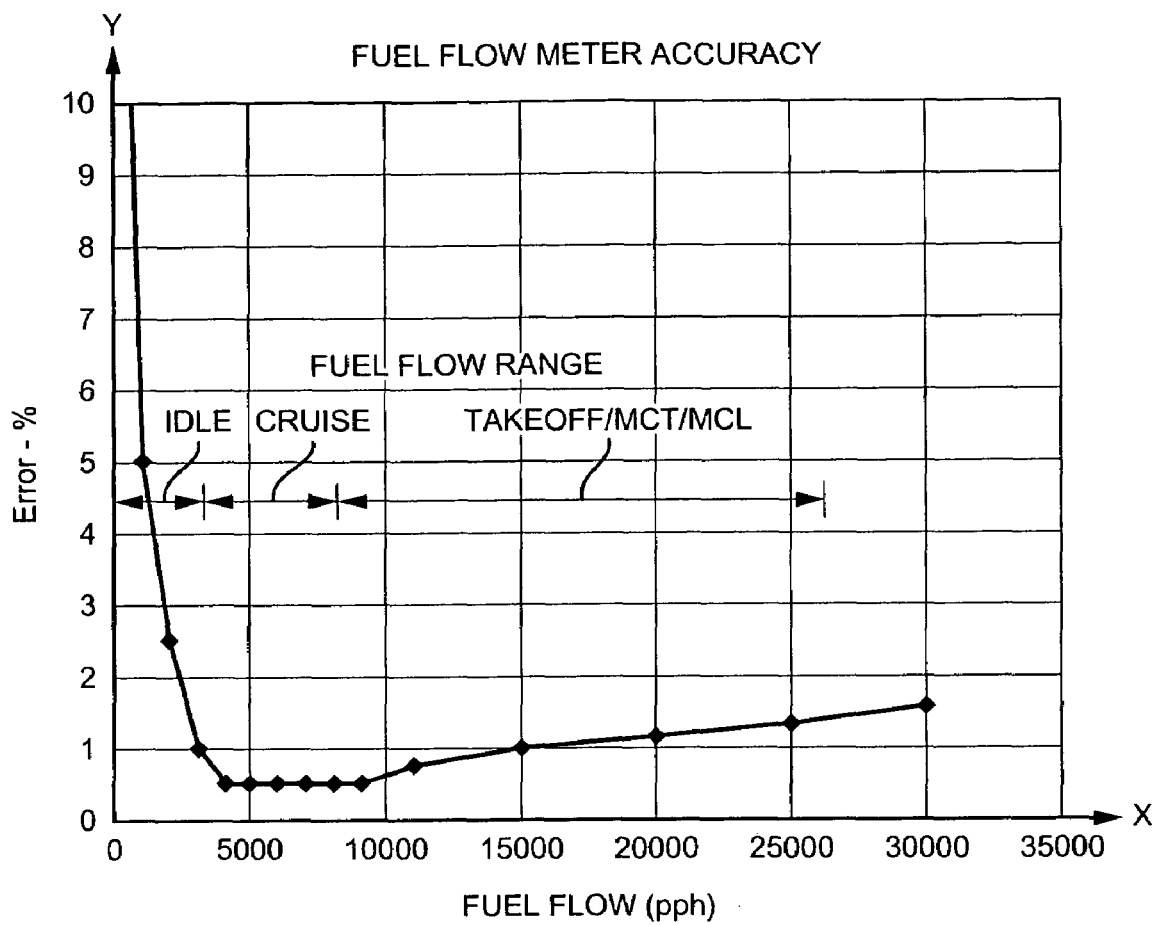
FIG. 4 is a graph plotting fuel flow pph (pounds per hour) versus percentage error of a standard fuel flow for a prior art aircraft fuel flow meter.
Figure 5:
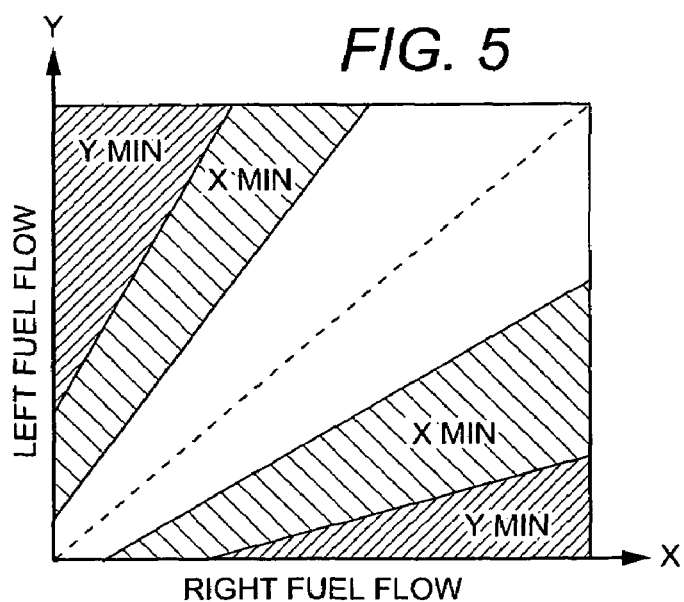
FIG. 5 is a graph showing a right engine fuel flow versus a left engine fuel flow with the method of one embodiment of the invention.

FIG. 3 is a graph plotting fuel flow pph (pounds per hour) versus accuracy of a standard fuel flow meter for a prior art aircraft fuel flow meter. FIG. 4 is a graph plotting fuel flow pph (pounds per hour) versus percentage error of a standard fuel flow for a prior art aircraft fuel flow meter. FIG. 5 is a graph showing a right engine fuel flow versus a left engine fuel flow with the method of one embodiment of the invention. The x axis shows the fuel flow for a first or right engine of an aircraft. The y axis shows the fuel flow for a second or left engine of an aircraft. A software program measures the thrust setting parameter of the second or left and first or right engines and determines whether they are equivalent. The "X min. (minutes)" (see FIG. 5) on the graph correspond to a first time period range to be determined, such as 10 minutes. The "X min." range is associated with a small leak. The "Y min. (minutes)" (see FIG. 5) on the graph correspond to a second time period range to be determined, such as 5 minutes. The "Y min." range is associated with a large leak. If the engine is set to a high thrust setting, the fuel flow rate may be unreliable. If the engine is set to a low thrust setting, the fuel flow may be unpredictable. Within the cruise range of the aircraft, it is preferable to have the left and right engines set to the same thrust setting, plus or minus a percentage, such as five percent. The percent difference in the fuel flow between the right engine and the left engine will determine when the system alerts the pilot or flight crew as to a problem. For example, if the fuel flow difference between the right engine and the left engine differs by only 10%, the alert may not be indicated. However, if the fuel flow difference between the right engine and the left engine differs by 50%, the alert would be indicated. The minimum percentage difference that the alert will be indicated is preferably approximately 15%. The threshold depends primarily on the fuel criticality of the mission the airplane is to fly. If the mission typically includes large amounts of reserve or contingency fuel, this percentage will increase. Conversely, if the mission typically includes small amounts of reserve or contingency fuel, this percentage will decrease. If the minimum higher percent is too large, the potential for a false negative indication would dictate the largest the minimum higher percent could be.

Figure 6:
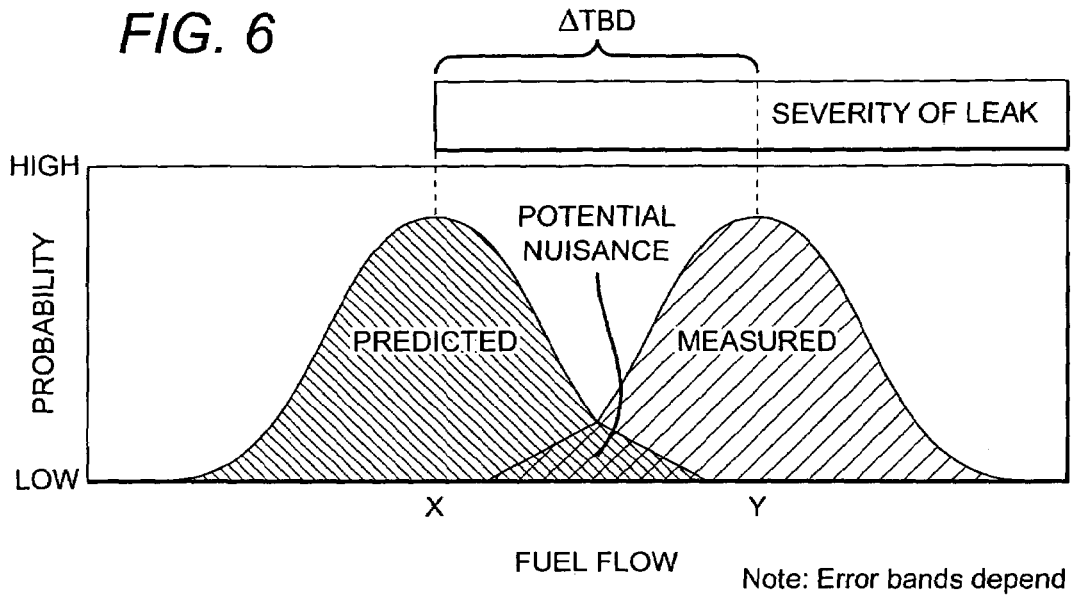
FIG. 6 is a graph showing fuel flow probability distributions for predicted fuel flow and measured fuel flow to determine the tolerances for the alerting system for an embodiment of the invention.

FIG. 6 is a graph showing fuel flow probability distributions for predicted fuel flow and measured fuel flow to determine the tolerances for the alerting system. A wide probability distribution for predicted fuel flow is the situation where the predictions indicate how much fuel an engine should be consuming but such prediction is somehow skewed due to, for example, not knowing the exact thrust setting of the engine or not knowing that the engine is an old engine rather than a new engine. A wide probability distribution for measured fuel flow is the situation where the measurement indicates how much fuel an engine is consuming but the measurement is in error due to, for example, an inaccuracy in the fuel flow meter. The potential nuisance is the overlap between the probability distribution of the predicted fuel flow and the probability distribution of the measured fuel flow. The overlap indicates an engine that is consuming less fuel than is measured and a predicted fuel flow that is too low. Probability distributions depend on many variables, such as, fuel flow meter accuracy, sophistication of the fuel flow prediction software, and accuracy of the measured thrust setting used by the fuel flow prediction software.

Figure 7:
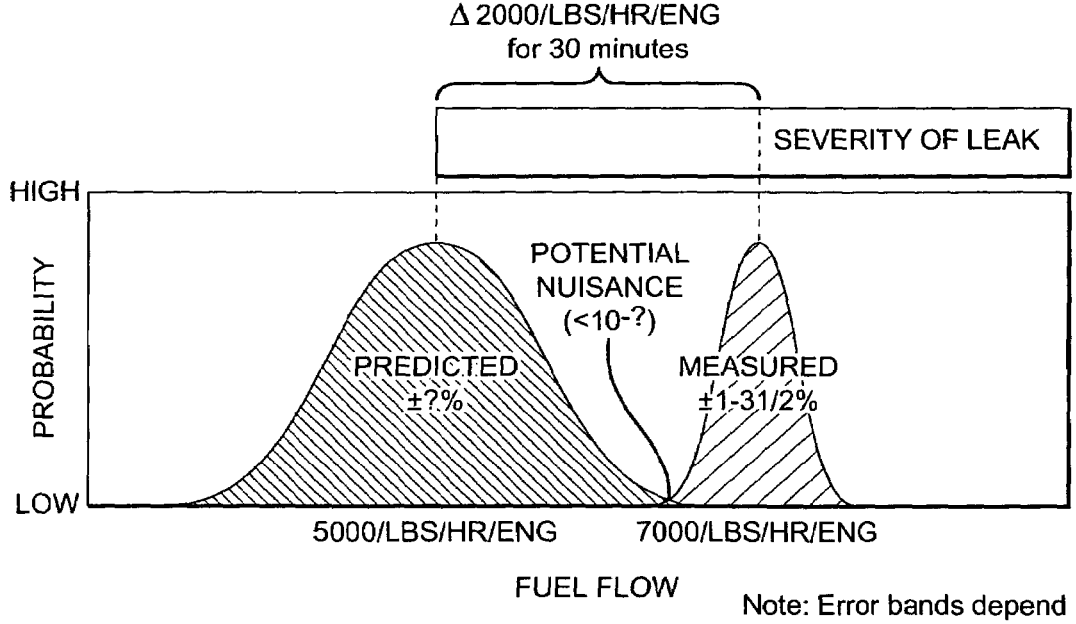
FIG. 7 is a graph showing fuel flow probability distributions for predicted fuel flow of 5000 pounds per hour per engine and measured fuel flow of 7000 pounds per hour per engine for an embodiment of the method.
Figure 8:
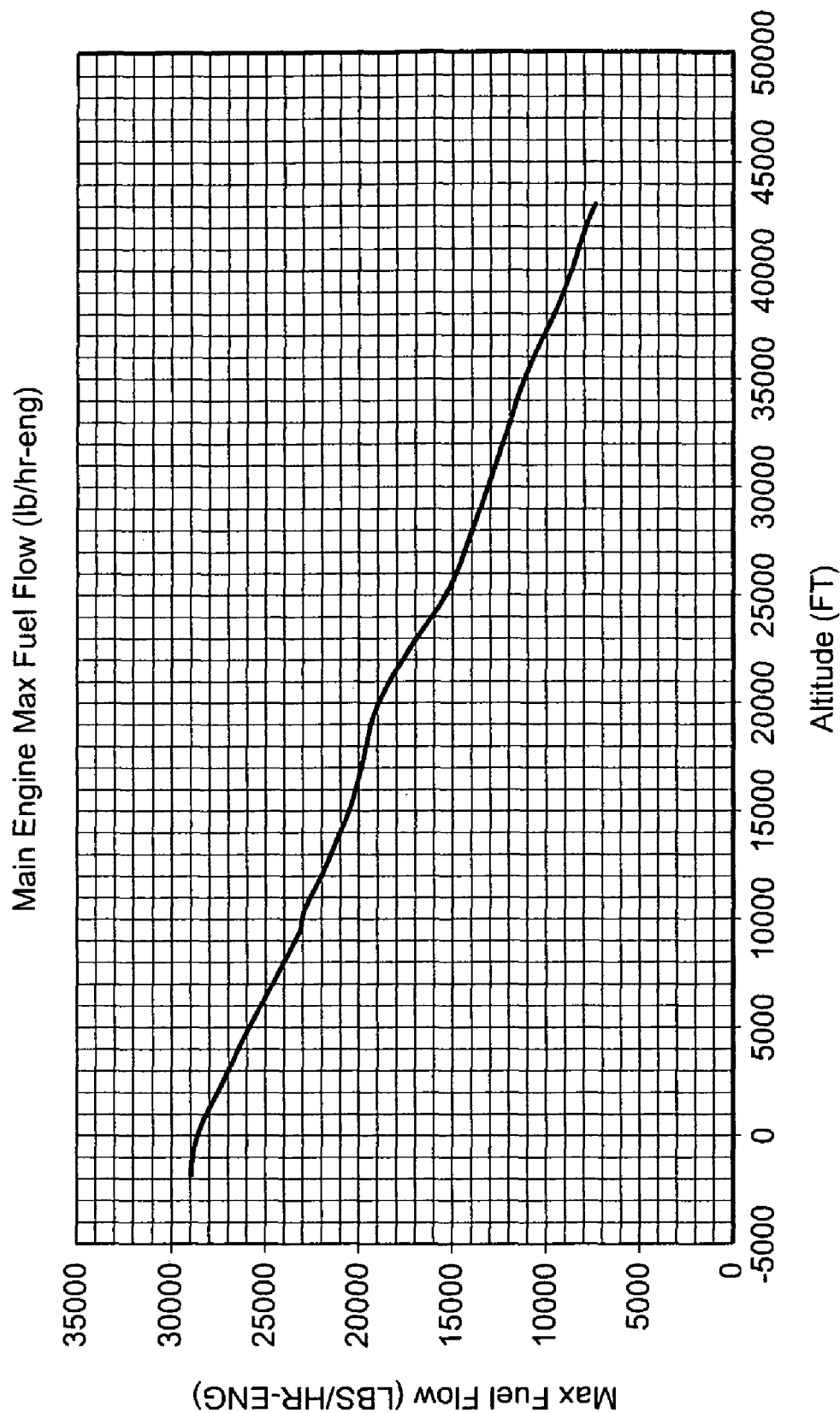
FIG. 8 is a graph showing the altitude versus maximum fuel flow for a prior art main engine maximum fuel flow.

FIG. 7 is a graph showing fuel flow probability distributions for predicted fuel flow of 5000 pounds per hour per engine and measured fuel flow of 7000 pounds per hour per engine for an embodiment of the method to determine the tolerances for the alerting system. Again, a wide probability distribution for predicted fuel flow is the situation where the predictions indicate how much fuel an engine should be consuming but such prediction is somehow skewed due to, for example, not knowing the exact thrust setting of the engine or not knowing that the engine is an old engine rather than a new engine. In this embodiment, the graph shows a predicted fuel flow of 5000 pounds per hour per engine. A wide probability distribution for measured fuel flow is the situation where the measurement indicates how much fuel an engine is consuming but the measurement is in error due to, for example, an inaccuracy in the fuel flow meter. In this embodiment, the graph shows a measured fuel flow of 7000 pounds per hour per engine. The potential nuisance is the overlap between the probability distribution of the predicted fuel flow and the probability distribution of the measured fuel flow. Further, the overlap indicates an engine that is consuming less fuel than is measured and a predicted fuel flow that is too low. Probability distributions depend on many variables, such as, fuel flow meter accuracy, sophistication of the fuel flow prediction software, and accuracy of the measured thrust setting used by the fuel flow prediction software. Preferably, the minimum difference is 2000 pounds per hour per engine for 30 minutes per existing fuel leak procedure. There should preferably be minimal difference with acceptable nuisance potential. As the difference is decreased, the potential for nuisance increases. Preferably, the minimum time is 30 minutes per existing fuel leak procedure. There should preferably be minimal delay to avoid nuisance from transient errors. Preferably, the alert system is used with dual engine cruise power range. However, the alert system may also be used with dual and single engine cruise power range. FIG. 8 is a graph showing the altitude versus maximum fuel flow for a prior art main engine maximum fuel flow. The x axis shows altitude of the aircraft in feet. The y axis shows maximum fuel flow in pounds per hour per engine. For example, the graph shows an engine that consumes from 30,000 pounds of fuel per hour to about 5000 pounds of fuel per hour in one flight. Thus, the range can be quite large.

Referring to FIG. 11, a flow chart of the logic of a cross engine comparison method with the monitoring and alert system of one embodiment of the method is shown and is generally identified by the numeral 100. A first step of the logic 102 is asking the question whether both engines of the aircraft are running at cruise thrust. Cruise thrust is defined as the thrust level between "a" and "b" that ensures accurate fuel flow measurements (i.e., not idle thrust and not take-off thrust). If the answer to step 102 is "no", then go back to the start of the method. If the answer to step 102 is "yes", then continue to step 104 of abs(L Thrust−R Thrust)<ΔThrust1, which means the absolute value of the difference of the left engine thrust parameter (i.e., N1 (fan speed), TPR (turbine pressure ratio), EPR (engine pressure ratio), or percent thrust) (L Thrust) and the right engine thrust parameter (i.e., N1, TPR, EPR, or percent thrust) (R Thrust) is less than the smaller thrust difference threshold (ΔThrust1). If step 104 is less than the smaller thrust difference threshold, continue to step 106. If step 104 is not less than the smaller thrust difference threshold, continue to step 108. Step 106 is (L FF−R FF)>ΔFF1 which means left engine fuel flow (i.e., pounds per hour or kilograms per hour) (L FF) minus right engine fuel flow (i.e., pounds per hour or kilograms per hour) (R FF) is greater than lower fuel flow difference threshold (ΔFF1). If step 106 is greater than the lower fuel flow difference threshold, continue to Timer 1 110 and alert 112 for excessive fuel flow to left engine. The Timer 1 is a longer time delay, and the signal must persist for "x" seconds or else return to Start. If step 106 is not greater than the lower fuel flow difference threshold, continue to step 114 which is (R FF−L FF)>ΔFF1 which means right engine fuel flow (i.e., pounds per hour or kilograms per hour) (R FF) minus left engine fuel flow (i.e., pounds per hour or kilograms per hour) (L FF) is greater than lower fuel flow difference threshold (ΔFF1). If step 114 is greater than the lower fuel flow difference threshold, continue to Timer 1 116 and alert 118 for excessive fuel flow to right engine. The Timer 1 is a longer time delay, and the signal must persist for "x" seconds or else return to Start. If step 114 is not greater than the lower fuel flow difference threshold, continue to Start. Step 108 is abs(L Thrust−R Thrust)<ΔThrust2, which means the absolute value of the difference of the left engine thrust parameter (i.e., N1 (fan speed), TPR (turbine pressure ratio), EPR (engine pressure ratio), or percent thrust) (L Thrust) and the right engine thrust parameter (i.e., N1, TPR, EPR, or percent thrust) (R Thrust) is less than the larger thrust difference threshold (ΔThrust2). If step 108 is less than the larger thrust difference threshold, continue to step 120. If step 108 is not less than the smaller thrust difference threshold, continue to Start. Step 120 is (L FF−R FF)>ΔFF2, which means left engine fuel flow (i.e., pounds per hour or kilograms per hour) (L FF) minus right engine fuel flow (i.e., pounds per hour or kilograms per hour) (R FF) is greater than higher fuel flow difference threshold (ΔFF2). If step 120 is greater than the higher fuel flow difference threshold, continue to Timer 2 122 and alert 124 for excessive fuel flow to left engine. The Timer 2 is a shorter time delay, and the signal must persist for "y" seconds or else return to Start. If step 120 is not greater than the higher fuel flow difference threshold, continue to step 126. Step 126 is (R FF−L FF)>ΔFF2, which means right engine fuel flow (i.e., pounds per hour or kilograms per hour) (R FF) minus left engine fuel flow (i.e., pounds per hour or kilograms per hour) (L FF) is greater than higher fuel flow difference threshold (ΔFF2). If step 126 is greater than the higher fuel flow difference threshold, continue to Timer 2 128 and alert 130 for excessive fuel flow to right engine. The Timer 2 is a shorter time delay, and the signal must persist for "y" seconds or else return to Start. If step 126 is not greater than the higher fuel flow difference threshold, continue to Start.

Referring to FIG. 12, a flow chart of the logic of a modeling comparison method with the monitoring and alert system of one embodiment of the method is shown and is generally identified by the numeral 200. A first step 202 of the logic chart 200 is asking the question whether an engine of the aircraft is running. If the answer is "yes", continue to step 204. If the answer is "no", return to Start. Step 204 is the step of predicting fuel flow using a model or look-up table. Inputs 206 may be made to step 204 wherein the inputs may comprise primary inputs of actual primary engine thrust parameters (i.e., N1 (fan speed), TPR (turbine pressure ratio), EPR (engine pressure ratio), or percent thrust) and secondary inputs of actual secondary engine parameters (i.e., N2 (intermediate pressure shaft speed), N3 (high pressure shaft speed), EGT (exhaust gas temperature), oil pressure, oil temperature, oil quantity). Once the actual and predicted fuel flows are obtained, continue to step 208. Step 208 is (FF Actual−FF Predicted)>ΔFF1, which means actual engine fuel flow (i.e., pounds per hour or kilograms per hour) (FF Actual) minus predicted engine fuel flow (i.e., pounds per hour or kilograms per hour) (FF Predicted) is greater than lower fuel flow difference threshold (ΔFF1). If step 208 is greater than the lower fuel flow difference threshold, continue to Timer 1 210 and alert 212 for excessive fuel flow to engine. The Timer 1 is a longer time delay, and the signal must persist for "x" seconds or else return to Start. If step 208 is not greater than the lower fuel flow difference threshold, continue to step 214. Step 214 is (FF Actual−FF Predicted)>ΔFF2, which means actual engine fuel flow (i.e., pounds per hour or kilograms per hour) (FF Actual) minus predicted engine fuel flow (i.e., pounds per hour or kilograms per hour) (FF Predicted) is greater than higher fuel flow difference threshold (ΔFF2). If step 214 is greater than the higher fuel flow difference threshold, continue to Timer 2 216 and alert 218 for excessive fuel flow to engine. The Timer 2 is a shorter time delay, and the signal must persist for "y" seconds or else return to Start. If step 214 is not greater than the higher fuel flow difference threshold, continue to Start.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed that modifications and other embodiments are intended to be included within the scope of the appended claims. Although specific terms are employed herein, they are used in a generic and descriptive sense only and not for purposes of limitation.

What is claimed is:

1. A method for automatically monitoring and alerting a fuel leak downstream of an engine fuel flow meter in an aircraft, the method comprising the steps of:
   obtaining a predicted fuel flow rate for each engine of the aircraft based on a set of predetermined reference operating parameters for each engine, the predetermined reference operating parameters including thrust, airspeed, altitude, outside air temperature, engine accessory loads, and engine age;
   obtaining a measured fuel flow rate for each engine of the aircraft based on actual operating parameters for each engine;
   using an engine monitoring system software to compare the predicted fuel flow rate to the measured fuel flow rate; and,
   automatically providing an alert of a fuel leak downstream of the engine fuel flow meter, the alert being on a flight deck display if there is a difference above a nuisance threshold between the measured fuel flow rate and the predicted fuel flow rate.

2. The method of claim 1 wherein the alert displayed on the flight deck display is "ENG FF HIGH L,R".

3. The method of claim 1 wherein the aircraft is a multi-engine aircraft.

4. The method of claim 1 wherein the method provides alerts for excessive engine fuel flow, possible engine fuel leaks, secondary engine indications, fuel flow to the affected engine, and expanded fuel quantity indications.

5. The method of claim 1 wherein the nuisance threshold is determined by a numerical probability analysis.

6. The method of claim 1 wherein the alert is an illuminated message displayed on the flight deck display in a cockpit.

7. A method for automatically monitoring and alerting a fuel leak downstream of an engine fuel flow meter in a multi-engine aircraft, the method comprising the steps of:
obtaining a first thrust setting of a first engine and a second thrust setting of a second engine, such that the first thrust setting is equivalent to the second thrust setting;
obtaining a fuel flow rate for the first engine and a fuel flow rate for the second engine;
using an engine monitoring system software to compare the fuel flow rate for the first engine to the fuel flow rate of the second engine; and,
automatically providing an alert of a fuel leak downstream of the engine fuel flow meter, the alert being on a flight deck display if there is a difference above a nuisance threshold between the fuel flow rate of the first engine and the fuel flow rate of the second engine, and wherein the method further provides alerts for fuel flow rate disagreement between the first and second engines, the possible engine fuel leaks, secondary engine indications, and expanded fuel quantity indications.

8. The method of claim 7 wherein the alert displayed on the flight deck display is "ENG FF DISAGREE".

9. The method of claim 7 wherein the aircraft has two engines where a first engine is located on a first side of the aircraft and a second engine is located on a second side of the aircraft.

10. The method of claim 7 wherein the nuisance threshold is determined by a numerical probability analysis.

11. The method of claim 7 wherein the alert is an illuminated message displayed on the flight deck display in a cockpit.

12. An automatic engine fuel flow monitoring and alerting fuel leak detection method for automatically monitoring and alerting a fuel leak downstream of an engine fuel flow meter in a two engine aircraft, the method comprising the steps of:
obtaining a predicted fuel flow rate for each engine of the aircraft based on a set of predetermined reference operating parameters for each engine, the predetermined reference operating parameters including thrust, airspeed, altitude, outside air temperature, engine accessory loads, and engine age;
obtaining a measured fuel flow rate for each engine of the aircraft based on actual operating parameters for each engine;
using an engine monitoring system software to compare the predicted fuel flow rate to the measured fuel flow rate;
automatically providing an alert of a fuel leak downstream of the engine fuel flow meter, the alert being on a flight deck display if there is a difference above a nuisance threshold between the measured fuel flow rate and the predicted fuel flow rate;
obtaining a thrust setting for each engine and making sure the thrust setting for each engine is equivalent;
obtaining a fuel flow rate for each engine;
using the engine monitoring system software to compare the fuel flow rate of each engine; and,
automatically providing an alert of the fuel leak downstream of the engine fuel flow meter, the alert being on the flight deck display if there is a difference above a nuisance threshold between the fuel flow rate of each engine.

13. The method of claim 12 wherein the method provides alerts for possible engine fuel leaks, secondary engine indications, and expanded fuel quantity indications.

14. The method of claim 12 wherein the nuisance threshold is determined by a numerical probability analysis.

15. The method of claim 12 wherein the alert is an illuminated message displayed on the flight deck display in a cockpit.

16. The method of claim 12 wherein a first engine is located on a first side of the aircraft and a second engine is located on a second side of the aircraft.

* * * * *